(12) United States Patent
Leleannec et al.

(10) Patent No.: US 11,909,974 B2
(45) Date of Patent: Feb. 20, 2024

(54) CHROMA QUANTIZATION PARAMETER ADJUSTMENT IN VIDEO ENCODING AND DECODING

(71) Applicant: InterDigital VC Holdings, Inc., Wilmington, DE (US)

(72) Inventors: Fabrice Leleannec, Cesson-Sevigne (FR); Franck Galpin, Cesson-Sevigne (FR); Tangi Poirier, Cesson-Sevigne (FR); Edouard Francois, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/043,280

(22) PCT Filed: Mar. 27, 2019

(86) PCT No.: PCT/US2019/024262
§ 371 (c)(1),
(2) Date: Sep. 29, 2020

(87) PCT Pub. No.: WO2019/191218
PCT Pub. Date: Oct. 3, 2019

(65) Prior Publication Data
US 2021/0051326 A1  Feb. 18, 2021

(30) Foreign Application Priority Data

Mar. 30, 2018 (EP) .................................. 18305386
Apr. 6, 2018 (EP) .................................. 18305412
Jul. 2, 2018 (EP) .................................. 18305848

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/186* (2014.11); *H04N 19/51* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 8,208,564 B2 | 6/2012 | Bossen et al. | |
| 9,877,019 B2 | 1/2018 | Chen et al. | |
| (Continued) | | | |

FOREIGN PATENT DOCUMENTS

| | | |
|---|---|---|
| CN | 101208957 A | 6/2008 |
| CN | 103392338 A | 11/2013 |
| (Continued) | | |

OTHER PUBLICATIONS

Li et al., "Non CE4: Fine granularity QP offset," Joint Collaborative Team on Video Coding (JCT-VC) of ITU-T SG16 WP3 and ISO/IEC JTC1/SC29/WG11, 7th Meeting: Geneva, Switzerland, Nov. 21-30, 2011, Document: JCTVC-G850. (Year: 2011).*

(Continued)

*Primary Examiner* — Reza Aghevli
(74) *Attorney, Agent, or Firm* — CONDO ROCCIA KOPTIW LLP

(57) ABSTRACT

A video coding system uses a value of a chroma quantization parameter table to quantize or de-quantize chroma values of a block of the video, the chroma quantization parameter table being directly coded in a set of parameters at the picture level or at the sequence level of the coded video stream. A corresponding encoding method, encoding device, decoding method, decoding device, and non-transitory readable medium are proposed.

20 Claims, 13 Drawing Sheets

(51) Int. Cl.
H04N 19/186 (2014.01)
H04N 19/51 (2014.01)
H04N 19/70 (2014.01)

(56) References Cited

U.S. PATENT DOCUMENTS

| | | | |
|---|---|---|---|
| 10,462,462 | B2 | 10/2019 | Chien et al. |
| 10,812,798 | B2* | 10/2020 | Chien ................... H04N 19/157 |
| 10,958,907 | B2* | 3/2021 | Tu .......................... H04N 19/46 |
| 11,039,175 | B2* | 6/2021 | Zhao ..................... H04N 19/124 |
| 2013/0259118 | A1 | 10/2013 | Fu et al. |
| 2013/0329785 | A1 | 12/2013 | Lim et al. |
| 2014/0254661 | A1 | 9/2014 | Saxena et al. |
| 2015/0003518 | A1* | 1/2015 | Nguyen ................. H04N 19/46 |
| | | | 375/240.03 |
| 2015/0071344 | A1* | 3/2015 | Tourapis .............. H04N 19/186 |
| | | | 375/240.03 |
| 2015/0373327 | A1* | 12/2015 | Zhang .................. H04N 19/157 |
| | | | 375/240.03 |
| 2016/0234492 | A1 | 8/2016 | Li et al. |
| 2017/0064302 | A1 | 3/2017 | Na et al. |
| 2017/0127059 | A1 | 5/2017 | Kim et al. |
| 2017/0345187 | A1 | 11/2017 | Sato |
| 2018/0020218 | A1 | 1/2018 | Zhao et al. |
| 2018/0020241 | A1* | 1/2018 | Li .......................... H04N 19/18 |
| 2018/0048901 | A1* | 2/2018 | Zhang .................. H04N 19/124 |
| 2018/0176596 | A1* | 6/2018 | Jeong ................... H04N 19/176 |
| 2018/0192069 | A1 | 7/2018 | Chen et al. |
| 2019/0068969 | A1* | 2/2019 | Rusanovskyy ....... H04N 19/186 |
| 2019/0124330 | A1* | 4/2019 | Chien .................. H04N 19/124 |
| 2019/0124366 | A1* | 4/2019 | Zhao ..................... H04N 19/124 |
| 2019/0191172 | A1* | 6/2019 | Rusanovskyy ....... H04N 19/124 |
| 2019/0289291 | A1* | 9/2019 | Sullivan ................. H04N 19/86 |
| 2020/0228803 | A1* | 7/2020 | Sullivan ................. H04N 19/70 |
| 2020/0382780 | A1* | 12/2020 | Xu ........................ H04N 19/159 |
| 2020/0404275 | A1* | 12/2020 | Hsiang ................... H04N 19/70 |
| 2021/0136380 | A1* | 5/2021 | Sullivan .............. H04N 19/186 |
| 2021/0185319 | A1* | 6/2021 | Tu .......................... H04N 19/46 |
| 2021/0211669 | A1* | 7/2021 | Sullivan ................. H04N 19/86 |

FOREIGN PATENT DOCUMENTS

| | | |
|---|---|---|
| CN | 104427339 A | 3/2015 |
| CN | 104584559 A | 4/2015 |
| EP | 2143279 A1 | 1/2010 |
| EP | 2143279 B1 | 10/2010 |
| EP | 2816805 A1 | 12/2014 |
| EP | 2988503 A1 | 2/2016 |
| JP | 2010-187302 A | 8/2010 |
| JP | 2017-520991 A | 7/2017 |
| JP | 2017216687 A | 12/2017 |
| WO | 2010/123862 A1 | 10/2010 |
| WO | 2017/008678 A1 | 1/2017 |
| WO | 2017/206826 A1 | 5/2017 |

OTHER PUBLICATIONS

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.
Xu et al., "Chroma QP Extension and Signalling Enhancement", Joint Collaborative Team on Video Coding (JCT-VC) of ITU-T SG 16 WP3 and ISO/IEC JTC 1/SC 29/WG 11, Document: JCTVC-10265, 9th Meeting, Geneva, Switzerland, Apr. 27, 2012, 11 pages.
Zhou et al., "New Rate-Complexity-Quantization Modeling and Efficient Rate Control for H.264/AVC", 2008 IEEE International Conference on Multimedia and Expo, Hannover, Germany, Jun. 23, 2008, pp. 717-720.
Li et al., "Multi-Type-Tree", Joint Video Exploration Team (JVET) of ITU-T SG 16 WP3 and ISO/IEC JTC 1/SC 29/ WG 11, Document JVET-D0117r1, 4th Meeting, Chengdu, China, Oct. 15, 2016, 3 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.
Bordes et al: "Description of SDR, HDR and 360 degree video coding technology proposal by Qualcomm and Technicolor—medium complexity version", Joint Video Experts Team (JVET) of ITU-T SG 16 WP 3 and ISO/IEC JTC 1/SC 29/WG 11, Document No. JVET-J0022-v3, 10th Meeting, San Diego California, US, Apr. 12, 2018, 83 pages.
Li et al., "Non CE4: Fine Granularity QP Offset", Joint Collaborative Team on Video Coding (JCT-VC) of ITU-T SG 16 WP3 and ISO/IEC JTC 1/SC 29/WG 11, Document: JCTVC-G850, 7th meeting: Geneva, Switzerland, Nov. 21, 2011, 9 pages.
Le Leannec et al., "Asymmetric Coding Units in QTBT", Joint Video Exploration Team (JVET) of ITU-T SG 16 WP 3 and ISO/IEC JTC 1/SC 29/WG 11, Document No. JVET-D0064, 4th Meeting, Chengdu, China, Oct. 15, 2016, 10 pages.
Chen et al., "Algorithm Description of Joint Exploration Test Model 6 (JEM 6)", JVET-F1001-V3, Editors, Joint Video Exploration Team (JVET) of ITU-T SG 16 WP3 and ISO/IEC JTC 1/SC 29/WG 11, 6th Meeting: Hobart, AU, Mar. 31-Apr. 7, 2017, 48 pages.
Chen et al., "Variable Block-Size Overlapped Block Motion Compensation in the Next Generation Open-source Video Codec", IEEE International Conference on Image Processing (ICIP), Sep. 17, 2017, pp. 938-942.
Cho et al., "Fast CU Splitting and Pruning for Suboptimal CU Partitioning in HEVC Intra Coding", IEEE Transactions on Circuits and Systems for Video Technology, vol. 23, No. 9, Sep. 2013, pp. 1555-1564.
Fu et al., "Sample Adaptive Offset for HEVC", IEEE 13th International Workshop on Multimedia Signal Processing, Hangzhou, 2011, 5 pages.
Grecos, Christos, "Beyond the High Efficiency Video Coding Standard: An Overview", Proceedings of SPIE, vol. 10223, May 1, 2017, pp. 102230F-1-102230F-18.
Guo et al., "Gradient Based Fast CU Splitting and Mode Decision Algorithm for HEVC Intra Prediction", IEEE 2014 International Conference on Anti-Counterfeiting, Security and Identification, Dec. 12, 2014, 5 pages.
Har-Noy et al., "Adaptive In-Loop Prediction Refinement for Video Coding", Multimedia Signal Processing, 9th Workshop on IEEE, Piscataway, Oct. 1, 2007, 4 pages.
Huang et al., "Affine Skip and Direct Modes for Efficient Video Coding", Visual Communications and Image Processing (VCIP), IEEE, Nov. 27, 2012, 6 pages.
ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.
Lin et al., "Affine Transform Prediction for Next Generation Video Coding", Huawei Technologies, ISO/IEC JTC1/SC29/WG11 MPEG2015/m37525, Geneva, Switzerland, Oct. 2015, 10 pages.
Reichel, "Joint Scalable Video Model JSVM-12 Text", JVT-Y202, JVT, Joint Video Team (JVT) of ISO/IEC MPEG & ITU-T VCEG (ISO/IEC JTC1/SC29/WG11 and ITU-T SG16 Q.6), 25th Meeting: Shenzhen, CN, Oct. 21-26, 2007, pp. 1-113.
Reznik, Yuriy A., "Relationship Between DCT-II, DCT-VI, and DST-VII Transforms", IEEE, May 26-31, 2013, pp. 5642-5646.
English Language Translation, CN104427339A, 39 pages.
English Language Translation, CN 104584559 A, 46 pages.
Li et al., "Non CE4: Fine granularity QP offset", JCTVC-G850, Joint Collaborative Team on Video Coding (JCT-VC) of ITU-T SG16 WP3 and ISO/IEC JTC1/SC29/WG11 7th Meeting: Geneva, CH, Nov. 21-30, 2011, 11 pages.
Ahmadianpour et al., "Novel Techniques for Reducing Blocking Artifacts in Motion Compensated Frame", Journal of Electronic Imaging, vol. 15, No. 1, Jan.-Mar. 2006, pp. 013007-1-013007-8.
Chen et al., "Algorithm Description of Joint Exploration Test Model 2", JVET-B1001_V3, Editors, Joint Video Exploration Team (JVET)

(56) References Cited

OTHER PUBLICATIONS of ITU-T SG16 WP3 and ISO/IEC JTC1/SC29/WG11, 2nd Meeting, San Diego, California, USA, Feb. 20-26, 2016, 32 pages.
Chen et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, 44 pages.
Wang et al., "Image Quality Assessment: From Error Visibility to Structural Similarity", IEEE Transactions on Image Processing, vol. 13, No. 4, Apr. 2004, pp. 600-612.
Wei et al., "Modified Winner Update with Adaptive Block Partition for Fast Motion Estimation", 2006 IEEE International Conference on Multimedia and Expo (ICME 2006), Ontario, Canada, Jul. 9, 2006, pp. 133-136.
Wen et al., "Parallel Merge/Skip Mode for HEVC", JCTVC-G387, Hong Kong University of Science and Technology, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-13.
Francois et al., "AHG5: on chroma QP for HEVC RExt", JCTVC-N0141, Canon, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 12 pages.

\* cited by examiner

|  | Reference | | | | | |
|---|---|---|---|---|---|---|
|  | kbps | Y psnr | U psnr | V psnr | Enc T[s] | Dec T[s] |
| FoodMarket4 | 2546.43 | 43.06 | 48.29 | 48.57 | 70011.59 | 32:176 |
|  | 1388.49 | 41.15 | 47.20 | 47.13 | 55837.54 | 37:640 |
|  | 978.49 | 39.86 | 46.35 | 46.08 | 49577.70 | 40:256 |
|  | 709.92 | 38.50 | 45.58 | 45.18 | 45804.74 | 43:142 |
| CatRobot1 | 7511.32 | 39.01 | 41.08 | 41.89 | 58479.67 | 29:488 |
|  | 5048.77 | 38.22 | 40.72 | 41.16 | 49464.77 | 32:256 |
|  | 3077.40 | 36.90 | 40.18 | 40.17 | 41933.33 | 36:528 |
|  | 1928.39 | 35.35 | 39.66 | 39.19 | 36756.35 | 40:-1 |
| DaylightRoad2 | 7781.59 | 36.72 | 44.35 | 41.79 | 82966.51 | 1.23 |
|  | 4748.85 | 35.99 | 43.81 | 41.19 | 69243.37 | 33:-1 |
|  | 3168.90 | 35.20 | 43.19 | 40.49 | 61331.64 | 36:402 |
|  | 2179.46 | 34.27 | 42.91 | 40.22 | 53994.23 | 39:160 |
| ParkRunning3 | 12233.83 | 33.74 | 31.83 | 33.56 | 64389.37 | 36:380 |
|  | 7807.64 | 32.19 | 31.17 | 32.96 | 56118.90 | 39:336 |
|  | 4668.01 | 30.72 | 30.39 | 32.28 | 47828.18 | 42:126 |
|  | 2652.82 | 29.34 | 29.55 | 31.63 | 43302.93 | 46:346 |
| Campfire | 16355.96 | 36.64 | 37.58 | 39.35 | 73853.25 | 1.27 |
|  | 9819.55 | 35.18 | 36.27 | 38.38 | 63458.79 | 1.45 |
|  | 4993.52 | 33.33 | 33.98 | 36.89 | 53363.16 | 1.59 |
|  | 2936.92 | 31.92 | 32.46 | 35.72 | 43949.12 | 42:240 |
| BQTerrace | 2557.76 | 33.93 | 40.14 | 42.43 | 9020.57 | 33:590 |
|  | 1877.04 | 33.24 | 39.53 | 41.87 | 7898.42 | 35:302 |
|  | 1083.56 | 31.76 | 38.83 | 41.23 | 6545.62 | 39:544 |
|  | 714.37 | 30.48 | 38.18 | 40.65 | 6029.40 | 42:-1 |
| RitualDance | 3609.31 | 42.37 | 45.59 | 46.30 | 28598.55 | 28:268 |
|  | 2225.72 | 39.88 | 44.39 | 44.90 | 25239.88 | 32:320 |
|  | 1521.86 | 37.98 | 43.59 | 44.03 | 23234.53 | 35:164 |
|  | 933.28 | 35.68 | 42.64 | 42.82 | 19473.37 | 39:204 |
| MarketPlace | 1649.62 | 36.43 | 42.16 | 43.42 | 17250.59 | 33:458 |
|  | 1059.35 | 35.19 | 41.54 | 42.77 | 14579.32 | 36:432 |
|  | 697.58 | 33.95 | 41.23 | 42.44 | 13280.15 | 39:512 |
|  | 485.95 | 32.97 | 40.85 | 42.01 | 11624.33 | 1.73 |
| BasketballDrive | 3666.92 | 38.36 | 43.71 | 44.36 | 21152.70 | 28:62 |
|  | 2062.96 | 37.12 | 42.92 | 43.16 | 17895.75 | 32:174 |
|  | 1213.40 | 35.62 | 42.09 | 41.93 | 15080.97 | 36:322 |
|  | 837.39 | 34.43 | 41.55 | 41.06 | 13147.09 | 39:300 |
| Cactus | 2745.36 | 35.41 | 38.68 | 40.94 | 12728.46 | 32:478 |
|  | 1804.40 | 34.16 | 38.22 | 40.11 | 11048.78 | 35:192 |
|  | 1216.60 | 32.89 | 37.77 | 39.41 | 9874.58 | 38:182 |
|  | 710.60 | 31.10 | 37.22 | 38.46 | 8246.72 | 42:484 |
| Average 4K |  |  |  |  |  | 1.23 |
| Average 1080P |  |  |  |  |  | 1.73 |
| Average all |  |  |  |  |  | 1.44 |

FIG. 5

| Tested | | | | | |
|---|---|---|---|---|---|
| kbps | Y psnr | U psnr | V psnr | Enc T[s] | Dec T[s] |
| 2413.74 | 43.19 | 48.40 | 48.69 | 56881.90 | 32:448 |
| 1458.18 | 41.74 | 47.21 | 47.15 | 47711.79 | 36:296 |
| 915.91 | 40.08 | 46.18 | 45.86 | 37191.60 | 40:576 |
| 656.48 | 38.74 | 45.27 | 44.80 | 30493.99 | 43:496 |
| 8080.02 | 39.31 | 41.30 | 42.33 | 107121.18 | 28:192 |
| 4893.90 | 38.45 | 40.86 | 41.41 | 77262.55 | 1.30 |
| 3187.20 | 37.40 | 40.41 | 40.51 | 57777.46 | 35:356 |
| 1994.92 | 35.96 | 39.94 | 39.58 | 44565.46 | 39:440 |
| 7891.27 | 36.90 | 44.58 | 42.02 | 131984.84 | 29:276 |
| 5062.03 | 36.34 | 44.10 | 41.49 | 92724.14 | 32:296 |
| 3345.28 | 35.63 | 43.51 | 40.81 | 66487.60 | 35:160 |
| 2041.68 | 34.49 | 42.98 | 40.26 | 50918.95 | 39:508 |
| 12644.65 | 34.50 | 31.90 | 33.67 | 103477.60 | 35:308 |
| 7968.02 | 32.90 | 31.11 | 32.96 | 79050.28 | 38:204 |
| 4259.47 | 30.92 | 30.22 | 32.19 | 53643.06 | 42.00 |
| 2923.89 | 29.85 | 29.72 | 31.78 | 43947.49 | 45:160 |
| 15603.17 | 36.81 | 37.27 | 39.44 | 111022.59 | 30:287 |
| 9993.58 | 35.74 | 36.13 | 38.68 | 91920.04 | 33:98 |
| 5579.82 | 34.24 | 34.08 | 37.39 | 71437.92 | 37:91 |
| 3140.33 | 32.65 | 32.39 | 36.09 | 51378.02 | 1.67 |
| 2891.08 | 34.35 | 40.66 | 42.91 | 16577.79 | 32:112 |
| 1799.76 | 33.35 | 39.81 | 42.03 | 11328.08 | 35:511 |
| 1176.89 | 32.28 | 39.17 | 41.49 | 8477.02 | 38:220 |
| 781.51 | 31.10 | 38.78 | 41.09 | 6736.44 | 41:340 |
| 3375.40 | 42.70 | 45.84 | 46.59 | 41732.08 | 28:536 |
| 2076.35 | 40.24 | 44.56 | 45.12 | 31235.92 | 32:552 |
| 1415.92 | 38.35 | 43.50 | 43.88 | 24203.39 | 35:444 |
| 872.52 | 36.06 | 42.53 | 42.61 | 18066.64 | 39:444 |
| 1540.93 | 36.62 | 42.26 | 43.59 | 20371.30 | 33:511 |
| 991.45 | 35.40 | 41.59 | 42.78 | 15638.47 | 36:479 |
| 752.26 | 34.60 | 41.31 | 42.49 | 13153.33 | 38:160 |
| 489.83 | 33.36 | 40.85 | 42.11 | 10890.59 | 41:336 |
| 3462.73 | 38.48 | 43.85 | 44.55 | 37574.38 | 28:250 |
| 1935.78 | 37.29 | 43.02 | 43.27 | 25680.31 | 32:408 |
| 1286.24 | 36.21 | 42.27 | 42.13 | 19726.11 | 35:101 |
| 882.45 | 35.06 | 41.57 | 41.06 | 14840.75 | 38:68 |
| 2993.48 | 35.95 | 38.86 | 41.23 | 24065.40 | 31:140 |
| 1712.00 | 34.36 | 38.30 | 40.21 | 16316.48 | 35:400 |
| 1154.38 | 33.10 | 37.85 | 39.46 | 12661.09 | 38:384 |
| 780.54 | 31.78 | 37.49 | 38.92 | 9917.82 | 41:152 |
| | | | | | 4.50 |
| | | | | | #NUM! |
| | | | | | 4.50 |

FIG. 5 (Continued)

| BD-rate (Piecewise Cubic) | | |
|---|---|---|
| Y | U | V |
| -11.58%<br>-11.58% | 0.88%<br>0.88% | 1.05%<br>1.05% |
| -12.93%<br>-12.93% | -16.39%<br>-16.39% | -13.66%<br>-13.66% |
| -14.15%<br>-14.15% | -16.70%<br>-16.70% | -15.01%<br>-15.01% |
| -16.20%<br>-16.20% | 3.26%<br>3.26% | -0.37%<br>-0.37% |
| -18.30%<br>-18.30% | 7.92%<br>7.92% | -10.95%<br>-10.95% |
| -9.11%<br>-9.11% | -18.65%<br>-18.65% | -13.80%<br>-13.80% |
| -13.34%<br>-13.34% | -8.61%<br>-8.61% | -7.96%<br>-7.96% |
| -13.30%<br>-13.30% | -7.12%<br>-7.12% | -6.26%<br>-6.26% |
| -12.87%<br>-12.87% | -8.46%<br>-8.46% | -6.25%<br>-6.25% |
| -10.84%<br>-10.84% | -12.00%<br>-12.00% | -9.25%<br>-9.25% |
| -14.63% | -4.20% | -7.79% |
| -11.89% | -10.97% | -8.70% |
| -13.26% | -7.59% | -8.25% |

FIG. 5 (Continued)

|  | Reference | | | | | |
|---|---|---|---|---|---|---|
|  | kbps | Y psnr | U psnr | V psnr | Enc T[s] | Dec T[s] |
| FoodMarket4 | 2546.43 | 43.06 | 48.29 | 48.57 | 70011.59 | 32:176 |
|  | 1388.49 | 41.15 | 47.20 | 47.13 | 55837.54 | 37:640 |
|  | 978.49 | 39.86 | 46.35 | 46.08 | 49577.70 | 40:256 |
|  | 709.92 | 38.50 | 45.58 | 45.18 | 45804.74 | 43:142 |
| CatRobot1 | 7511.32 | 39.01 | 41.08 | 41.89 | 58479.67 | 29:488 |
|  | 5048.77 | 38.22 | 40.72 | 41.16 | 49464.77 | 32:256 |
|  | 3077.40 | 36.90 | 40.18 | 40.17 | 41933.33 | 36:528 |
|  | 1928.39 | 35.35 | 39.66 | 39.19 | 36756.35 | 40:-1 |
| DaylightRoad2 | 7781.59 | 36.72 | 44.35 | 41.79 | 82966.51 | 1.23 |
|  | 4748.85 | 35.99 | 43.81 | 41.19 | 69243.37 | 33:-1 |
|  | 3168.90 | 35.20 | 43.19 | 40.49 | 61331.64 | 36:402 |
|  | 2179.46 | 34.27 | 42.91 | 40.22 | 53994.23 | 39:160 |
| ParkRunning3 | 12233.83 | 33.74 | 31.83 | 33.56 | 64389.37 | 36:380 |
|  | 7807.64 | 32.19 | 31.17 | 32.96 | 56118.90 | 39:336 |
|  | 4668.01 | 30.72 | 30.39 | 32.28 | 47828.18 | 42:126 |
|  | 2652.82 | 29.34 | 29.55 | 31.63 | 43302.93 | 46:346 |
| Campfire | 16355.96 | 36.64 | 37.58 | 39.35 | 73853.25 | 1.27 |
|  | 9819.55 | 35.18 | 36.27 | 38.38 | 63458.79 | 1.45 |
|  | 4993.52 | 33.33 | 33.98 | 36.89 | 53363.16 | 1.59 |
|  | 2936.92 | 31.92 | 32.46 | 35.72 | 43949.12 | 42:240 |
| BQTerrace | 2557.76 | 33.93 | 40.14 | 42.43 | 9020.57 | 33:590 |
|  | 1877.04 | 33.24 | 39.53 | 41.87 | 7898.42 | 35:302 |
|  | 1083.56 | 31.76 | 38.83 | 41.23 | 6545.62 | 39:544 |
|  | 714.37 | 30.48 | 38.18 | 40.65 | 6029.40 | 42:-1 |
| RitualDance | 3609.31 | 42.37 | 45.59 | 46.30 | 28598.55 | 28:268 |
|  | 2225.72 | 39.88 | 44.39 | 44.90 | 25239.88 | 32:320 |
|  | 1521.86 | 37.98 | 43.59 | 44.03 | 23234.53 | 35:164 |
|  | 933.28 | 35.68 | 42.64 | 42.82 | 19473.37 | 39:204 |
| MarketPlace | 1649.62 | 36.43 | 42.16 | 43.42 | 17250.59 | 33:458 |
|  | 1059.35 | 35.19 | 41.54 | 42.77 | 14579.32 | 36:432 |
|  | 697.58 | 33.95 | 41.23 | 42.44 | 13280.15 | 39:512 |
|  | 485.95 | 32.97 | 40.85 | 42.01 | 11624.33 | 1.73 |
| BasketballDrive | 3666.92 | 38.36 | 43.71 | 44.36 | 21152.70 | 28:62 |
|  | 2062.96 | 37.12 | 42.92 | 43.16 | 17895.75 | 32:174 |
|  | 1213.40 | 35.62 | 42.09 | 41.93 | 15080.97 | 36:322 |
|  | 837.39 | 34.43 | 41.55 | 41.06 | 13147.09 | 39:300 |
| Cactus | 2745.36 | 35.41 | 38.68 | 40.94 | 12728.46 | 32:478 |
|  | 1804.40 | 34.16 | 38.22 | 40.11 | 11048.78 | 35:192 |
|  | 1216.60 | 32.89 | 37.77 | 39.41 | 9874.58 | 38:182 |
|  | 710.60 | 31.10 | 37.22 | 38.46 | 8246.72 | 42:484 |
| Average 4K | | | | | | 1.23 |
| Average 1080P | | | | | | 1.73 |
| Average all | | | | | | 1.44 |

FIG. 6

| Tested | | | | | |
|---|---|---|---|---|---|
| kbps | Y psnr | U psnr | V psnr | Enc T[s] | Dec T[s] |
| 2397.20 | 43.19 | 48.26 | 48.49 | 61826.31 | 32:448 |
| 1448.88 | 41.74 | 47.08 | 46.96 | 46807.94 | 36:296 |
| 902.85 | 40.06 | 45.93 | 45.56 | 35819.73 | 40:576 |
| 654.17 | 38.74 | 45.01 | 44.43 | 29383.13 | 43:496 |
| 8055.38 | 39.31 | 41.28 | 42.29 | 111305.62 | 28:192 |
| 4852.75 | 38.45 | 40.81 | 41.33 | 77359.90 | 1.30 |
| 3168.35 | 37.40 | 40.38 | 40.43 | 57538.72 | 35:356 |
| 1974.00 | 35.96 | 39.82 | 39.39 | 44239.95 | 39:440 |
| 7871.66 | 36.90 | 44.57 | 42.01 | 138082.00 | 29:276 |
| 5056.88 | 36.35 | 44.08 | 41.45 | 92266.46 | 32:296 |
| 3344.08 | 35.63 | 43.47 | 40.80 | 67499.85 | 35:160 |
| 2034.62 | 34.49 | 42.85 | 40.17 | 50364.21 | 39:508 |
| 12302.02 | 34.48 | 31.76 | 33.54 | 105422.85 | 35:308 |
| 7721.18 | 32.88 | 30.94 | 32.80 | 77564.43 | 38:204 |
| 4164.66 | 30.90 | 30.09 | 32.08 | 52640.49 | 42.00 |
| 2875.09 | 29.83 | 29.60 | 31.69 | 42783.07 | 45:160 |
| 15305.80 | 36.81 | 37.01 | 39.35 | 110540.20 | 30:287 |
| 9527.60 | 35.74 | 35.67 | 38.50 | 93297.46 | 33:98 |
| 5293.68 | 34.23 | 33.66 | 37.20 | 69734.75 | 37:91 |
| 3006.65 | 32.64 | 32.07 | 35.92 | 49396.41 | 1.67 |
| 2887.95 | 34.34 | 40.66 | 42.88 | 16312.16 | 32:112 |
| 1795.95 | 33.35 | 39.77 | 42.04 | 11427.26 | 35:511 |
| 1176.40 | 32.28 | 39.10 | 41.44 | 8401.69 | 38:220 |
| 782.14 | 31.10 | 38.77 | 41.11 | 6832.97 | 41:340 |
| 3357.83 | 42.69 | 45.73 | 46.46 | 40999.73 | 28:536 |
| 2060.28 | 40.24 | 44.33 | 44.84 | 31266.12 | 32:552 |
| 1405.28 | 38.35 | 43.34 | 43.60 | 23796.56 | 35:444 |
| 867.08 | 36.06 | 42.26 | 42.27 | 18314.64 | 39:444 |
| 1536.29 | 36.62 | 42.18 | 43.51 | 20615.26 | 33:511 |
| 989.93 | 35.41 | 41.53 | 42.79 | 15754.92 | 36:479 |
| 749.71 | 34.61 | 41.19 | 42.33 | 13105.83 | 38:160 |
| 487.24 | 33.35 | 40.80 | 41.97 | 10750.90 | 41:336 |
| 3445.32 | 38.48 | 43.79 | 44.44 | 37586.24 | 28:250 |
| 1920.11 | 37.30 | 42.93 | 43.06 | 25645.32 | 32:408 |
| 1276.07 | 36.21 | 42.14 | 41.89 | 19587.38 | 35:101 |
| 871.68 | 35.08 | 41.30 | 40.74 | 14637.92 | 38:68 |
| 2980.85 | 35.95 | 38.83 | 41.17 | 24149.36 | 31:140 |
| 1702.92 | 34.34 | 38.24 | 40.12 | 16315.32 | 35:400 |
| 1150.16 | 33.10 | 37.78 | 39.34 | 12234.86 | 38:384 |
| 778.56 | 31.81 | 37.40 | 38.78 | 10032.06 | 41:152 |
| | | | | | 4.50 |
| | | | | | #NUM! |
| | | | | | 4.50 |

FIG. 6 (Continued)

| BD-rate (Piecewise Cubic) | | |
|---|---|---|
| Y | U | V |
| -12.16%<br>-12.16% | 7.59%<br>7.59% | 8.22%<br>8.22% |
| -13.58%<br>-13.58% | -13.25%<br>-13.25% | -10.01%<br>-10.01% |
| -14.21%<br>-14.21% | -13.21%<br>-13.21% | -12.66%<br>-12.66% |
| -17.88%<br>-17.88% | 10.86%<br>10.86% | 7.43%<br>7.43% |
| -21.96%<br>-21.96% | 17.70%<br>17.70% | -7.72%<br>-7.72% |
| -9.14%<br>-9.14% | -15.62%<br>-15.62% | -12.67%<br>-12.67% |
| -13.96%<br>-13.96% | -2.01%<br>-2.01% | -0.41%<br>-0.41% |
| -13.65%<br>-13.65% | -1.21%<br>-1.21% | -1.14%<br>-1.14% |
| -13.64%<br>-13.64% | -3.13%<br>-3.13% | 0.73%<br>0.73% |
| -11.18%<br>-11.18% | -7.08%<br>-7.08% | -4.54%<br>-4.54% |
| -15.96% | 1.94% | -2.95% |
| -12.32% | -5.81% | -3.61% |
| -14.14% | -1.94% | -3.28% |

FIG. 6 (Continued)

CHROMA QUANTIZATION PARAMETER ADJUSTMENT IN VIDEO ENCODING AND DECODING

CROSS REFERENCE TO RELATED APPLICATIONS

This application is the national stage entry under 35 U.S.C. § 371 of International Application PCT/US2019/024262 filed Mar. 27, 2019, which was published in accordance with PCT Article 21(2) on Oct. 3, 2019, in English, and which claims the benefit of European Patent Application No. 18305386.7, filed Mar. 30, 2018, European Patent Application No. 18305412.1, filed Apr. 6, 2018 and European Patent Application No. 18305848.6, filed Jul. 2, 2018.

TECHNICAL FIELD

At least one of the present embodiments generally relates to video encoding or decoding. At least one embodiment relates, more particularly, to a method, an apparatus and a signal for adjusting chroma quantization parameters in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a first aspect of at least one embodiment, a method for encoding video data is presented, comprising: selecting, for a block of an image, at least one chroma quantization parameter from among multiple sets of chroma quantization parameters based on an encoding performance level, wherein the sets of chroma quantization parameters are different depending on whether the image is motion-predicted or not; encoding said block based on at least one selected chroma quantization parameter, wherein the encoding includes quantizing chroma values of said block according to said at least one selected chroma quantization parameter, and generating a bitstream comprising at least said encoded block and metadata representative of said at least one selected chroma quantization parameter.

According to a second aspect of at least one embodiment, a method for decoding video data is presented, comprising: accessing metadata of a block of an image or video, said metadata being representative of a selection of at least one chroma quantization parameter from among multiple sets of chroma quantization parameters, said selection being based on an encoding performance level; and de-quantizing chroma values of the block according to said metadata representative of said selection of at least one chroma quantization parameter.

According to a third aspect of at least one embodiment, a signal for encoded image is presented, comprising information representative of at least one chroma quantization parameter selected from among multiple sets of chroma quantization parameters based on an encoding performance level, wherein the sets of chroma quantization parameters are different depending on whether the image is motion-predicted or not, wherein said selecting is for at least one block of an image.

According to a fourth aspect of at least one embodiment, a device for encoding video data is presented, comprising: means for selecting, for a block of an image, at least one chroma quantization parameter from among multiple sets of chroma quantization parameters based on an encoding performance level, wherein the sets of chroma quantization parameters are different depending on whether the image is motion-predicted or not; means for encoding said block based on at least one selected chroma quantization parameter, wherein the encoding includes quantizing chroma values of said block according to said at least one selected chroma quantization parameter, and means for generating a bitstream comprising at least said encoded block and metadata representative of said at least one selected chroma quantization parameter.

According to a fifth aspect of at least one embodiment, a device for decoding video data is presented, comprising: means for accessing metadata of a block of an image or video, said metadata being representative of a selection of at least one chroma quantization parameter from among multiple sets of chroma quantization parameters, said selection being based on an encoding performance level; and means for de-quantizing chroma values of the block according to said metadata representative of said selection of at least one chroma quantization parameter.

According to a sixth aspect of at least one embodiment, a device for displaying video data is presented, comprising one or more processors configured to: access metadata of a block of an image or video, said metadata being representative of a selection of at least one chroma quantization parameter from among multiple sets of chroma quantization parameters, said selection being based on an encoding performance level; de-quantize chroma values of the block according to said metadata representative of said selection of at least one chroma quantization parameter; and produce a reconstructed image based on the de-quantized chroma values of a plurality of blocks of the image; and a display configured to display the reconstructed image.

According to a seventh aspect of at least one embodiment, a device for receiving video data is presented, comprising: an antenna configured to receive a signal over the air comprising an image or a video; one or more processors configured to: access metadata of a block of the received image or video, said metadata being representative of a selection of at least one chroma quantization parameter from among multiple sets of chroma quantization parameters, said selection being based on an encoding performance level; de-quantize chroma values of the block according to said metadata representative of said selection of at least one chroma quantization parameter; and produce a reconstructed image based on the de-quantized chroma values of a plurality of blocks of the image; and an output configured to provide the reconstructed image.

According to another aspect of at least one embodiment, a non-transitory computer readable medium is presented comprising data content generated according to the method or the apparatus of any of the preceding claims.

According to another aspect of at least one embodiment, a computer program is presented comprising program code instructions executable by a processor for implementing the steps of a method according to at least the first aspect.

According to another aspect of at least one embodiment, a computer program is presented, which is stored on a non-transitory computer readable medium and comprises program code instructions executable by a processor for implementing the steps of a method according to at least the first aspect.

According to variant embodiments of first and fourth aspects, the encoding performance level is automatically chosen according to information related to coding, said information being related to the coding tree configuration or the coding mode or the partitioning mode.

BRIEF DESCRIPTION OF THE DRAWINGS

FIG. 5 illustrates the coding efficiency increase by using a QTBT+ABT coding structure.

FIG. 6 illustrates the coding efficiency increase from using a QTBT+ABT coding structure in an embodiment implementing the chroma quantization adaptation.

DETAILED DESCRIPTION

In at least one embodiment, a coding efficiency improvement results from the use of topologies for block division described below. In particular, in some embodiments, a larger gain is obtained in the chroma components than in the luma component. As a consequence, it is of interest to balance the coding gain obtained, by shifting some gain from one or more chroma components to the luma component. This is particularly beneficial in certain embodiments because at a certain level of quality, no additional visual benefit typically results from additional coding efficiency improvement in the chroma components. Therefore, at least one embodiment proposes to employ a quantization parameter in such a way to trade off further quality improvement between the chroma components and the luma component. At least one such embodiment reduces the overall bit-rate of the whole coded bit-stream including chroma components and luma component.

Figure 1:
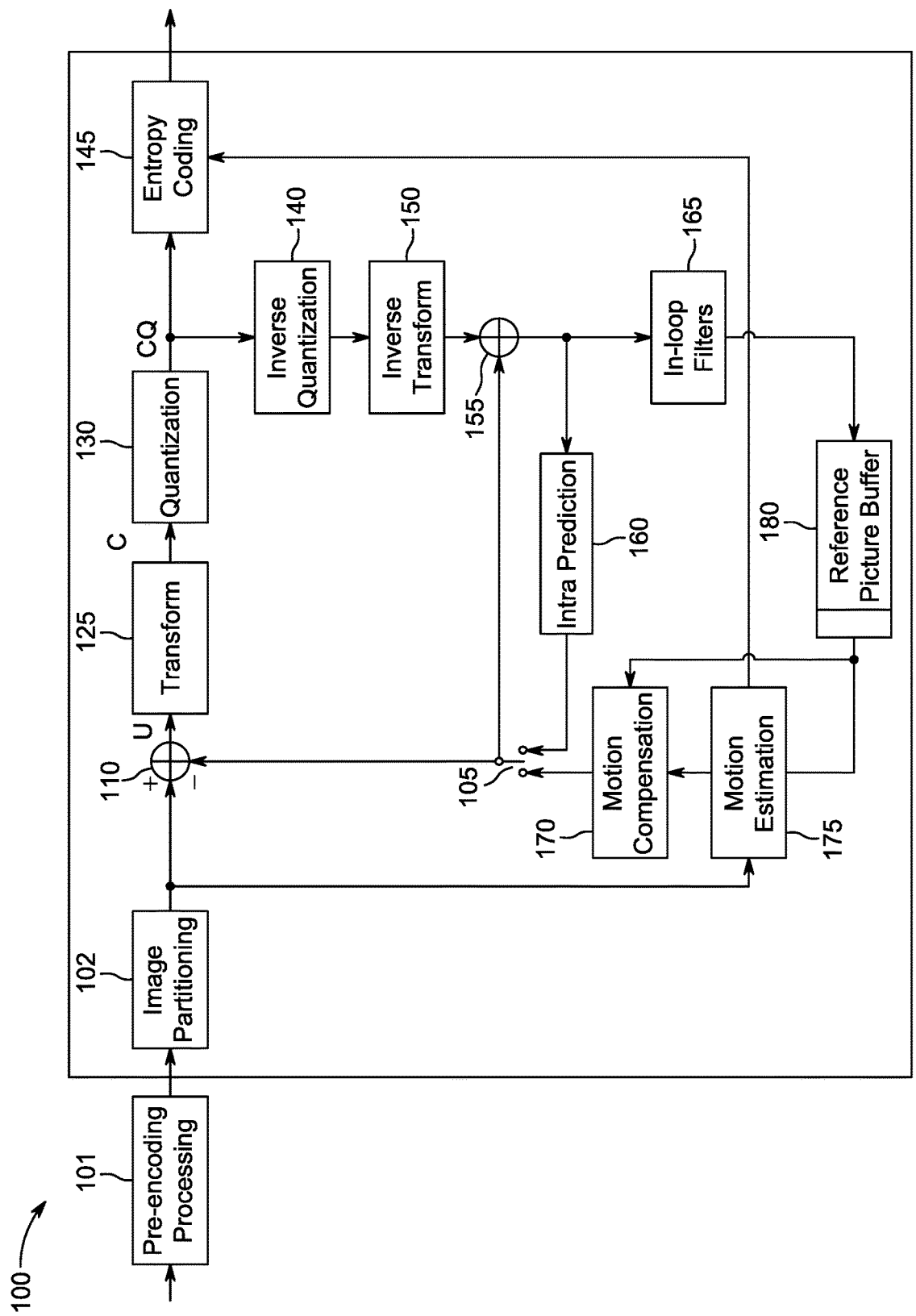
FIG. 1 illustrates an example of video encoder 100, such as a High Efficiency Video Coding (HEVC) encoder.

FIG. 1 illustrates an example of video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
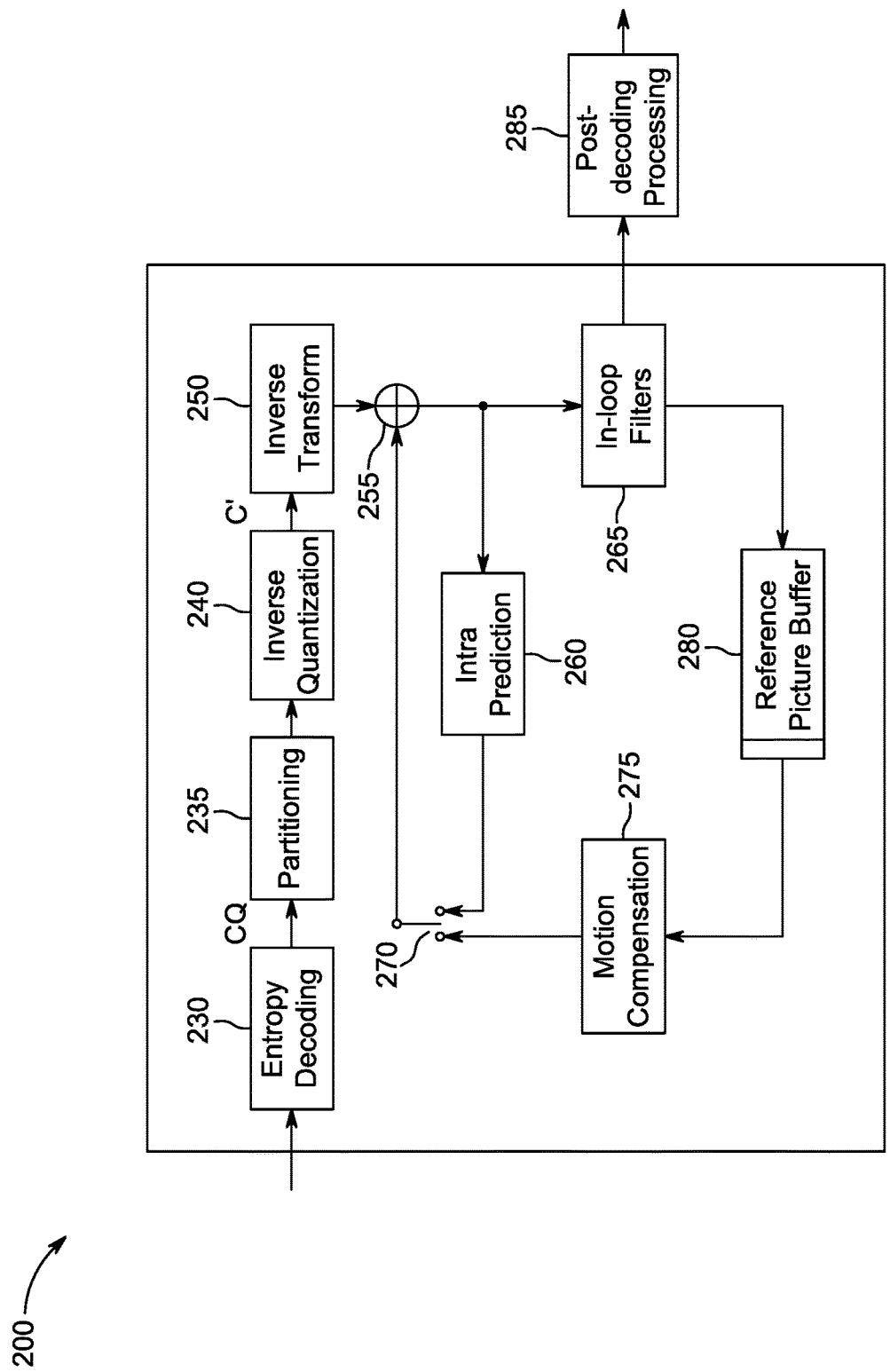
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

New emerging video compression tools include a Coding Tree Unit representation in the compressed domain are proposed to represent picture data in a more flexible way. The advantage of this more flexible representation of the coding tree is that it provides increased compression efficiency compared to the CU/PU/TU arrangement of the HEVC standard.

Figure 3:
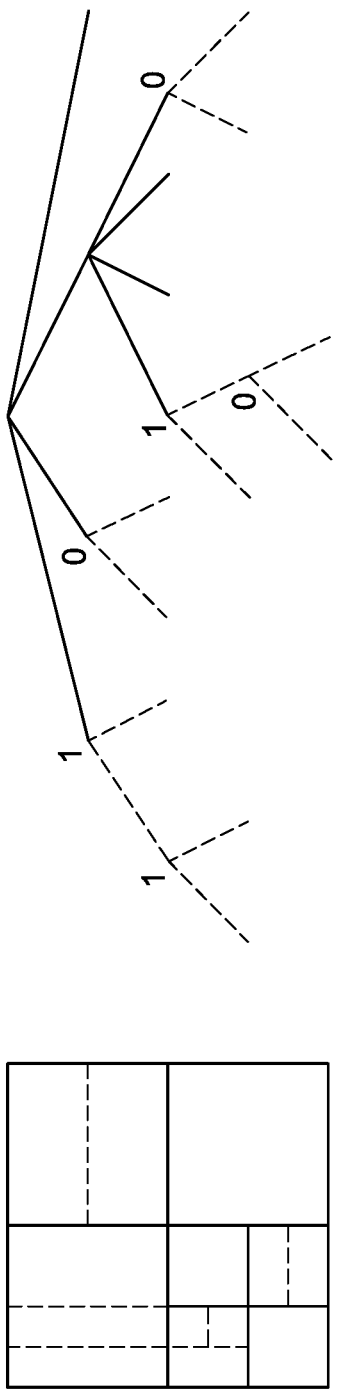
FIG. 3 illustrates an example of Quad-Tree plus Binary-Tree (QTBT) CTU representation.

FIG. 3 illustrates an example of Quad-Tree plus Binary-Tree (QTBT) CTU representation. The Quad-Tree plus Binary-Tree (QTBT) coding tool provides such increased flexibility. QTBT consists in a coding tree where coding units can be split both in a quad-tree and in a binary-tree fashion. The splitting of a coding unit is decided on the encoder side through a rate distortion optimization procedure, that determines the QTBT representation of the CTU with minimal rate distortion cost. In the QTBT technology, a CU has either square or rectangular shape. The size of coding unit is always a power of 2, and typically goes from 4 to 128. In additional to this variety of rectangular shapes for a coding unit, such CTU representation has the following different characteristics compared to HEVC. The QTBT decomposition of a CTU is made of two stages: first the CTU is split in a quad-tree fashion, then each quad-tree leaf can be further divide in a binary fashion. This is illustrated on the right side of the figure where solid lines represent the quad-tree decomposition phase and dashed lines represent the binary decomposition that is spatially embedded in the quad-tree leaves. In intra slices, the Luma and Chroma block partitioning structure is separated, and decided independently. No more CU partitioning into predictions units or transform unit is employed. In other words, each Coding Unit is systematically made of a single prediction unit (2N×2N prediction unit partition type) and single transform unit (no division into a transform tree).

Figure 4:
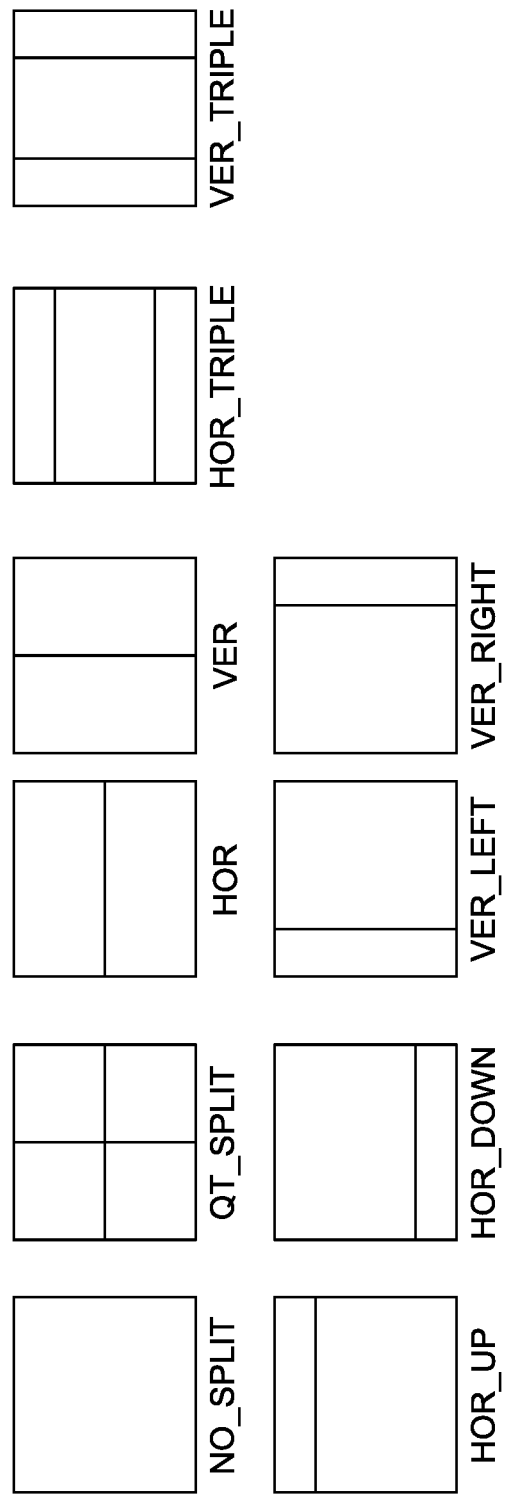
FIG. 4 illustrates an example of extended set of Coding Unit partitioning.

FIG. 4 illustrates an example of extended set of Coding Unit partitioning. In an asymmetric binary and tree split modes (ABT), a rectangular coding unit with size (w, h) (width and height) that would be split through one of the asymmetric binary splitting modes, for example HOR_UP (horizontal-up), would lead to 2 sub-coding units with respective rectangular sizes $$\left(w, \frac{h}{4}\right) \text{ and } \left(w, \frac{3h}{4}\right).$$

In addition, a so-called triple tree partitioning of a CU may be used, leading to the set of possible partitions given in FIG. 5. Triple tree consists in splitting a CU into tree sub-CU with size (¼, ½, ¼) relative to the parent CU, in the considered orientation (for example: HOR_TRIPLE for the horizontal split mode).

FIG. 5 illustrates the coding efficiency increase by using a QTBT+ABT coding structure. Such coding structure is proposed in JVET-J0022. The table of FIG. 5 shows the coding results for a subset of selected images listed in the first column. In the second column entitled "Reference", the numbers represent encoding performance of the reference encoder, according to some encoding parameters, showing respectively the bit rate, the PSNR for Y, U and V components, the encoding time and the decoding time. In the third column entitled "Tested", the numbers represent encoding performance of the reference encoder modified to use QTBT+ABT coding structure with the same encoding parameters as for the "Reference" encoding. This third column shows respectively the bit rate, the PSNR for Y, U and V components, the encoding time and the decoding time. In the fifth column, the numbers represent the bitrate improvement for Y, U and V components.

A coding efficiency improvement is shown in the last columns, compared to standard coding. In particular, in some embodiments, a larger gain is obtained in the chroma components than in the luma component.

To fully benefit from such improvement, it is of interest to balance the coding gain obtained, by shifting some gain from one or more chroma components to the luma component. This is particularly beneficial in certain embodiments because at a certain level of quality, no additional visual benefit typically results from additional coding efficiency improvement in the chroma component(s). Therefore, at least one embodiment proposes to employ a quantization parameter in such a way to trade off further quality improvement between the chroma components and the luma component. At least one such embodiment reduces the overall bit-rate of the whole coded bit-stream including chroma components and luma component.

FIG. 6 illustrates the coding efficiency increase from using a QTBT+ABT coding structure in an embodiment implementing the chroma quantization adaptation. FIG. 6 shows the coding efficiency performances obtained by using the video codec of JVET-J0022 used in the configuration of FIG. 5 but with the addition of the chroma quantization adaptation. The table of FIG. 6 shows the coding results for a subset of selected images listed in the first column, according to some parameters listed in the second column. In the third column, the numbers represent encoding performance of the reference encoder, showing respectively the bit rate, the PSNR for Y, U and V components. In the fourth column, the numbers represent encoding performance of the reference encoder modified to use QTBT+ABT coding structure. This fourth column shows respectively the bit rate, the PSNR for Y, U and V components. In the fifth column, the numbers represent the bitrate improvement for Y, U and V components.

The table shows a noticeable coding efficiency improvement in the luma, with a moderate relative loss in chroma coding efficiency, compared to FIG. 5. Moreover, since the luma component is typically much more important from a perceptual viewpoint, prioritizing the luma over the chroma in terms of coding efficiency is of great interest.

In an embodiment, the chroma quantization parameter adaptation allows to trade off the bitrate allocation between the luma and the chroma components in a video coding scheme, so that the coding efficiency of the luma component is being adjusted with a controlled penalty in the coding efficiency in the chroma components. Moreover, in at least one embodiment, the use of a luma/chroma bitrate allocation is made independently from the coding tools that are being used in the coding and decoding.

A first approach considers using the well-known chroma QP (quantization parameter) offset sequence level parameter, which is being signaled in the high level syntax (Sequence Parameter Set) of the coded bit-stream. A drawback of such an approach is that the loss in chroma coding efficiency may be too high, and difficult to control. Another approach considers using a so-called chroma QP table, which is used to derive the QP of a slice in chroma, given the QP used in the luma slice of same picture, in Inter Slices. In the JEM, given the QP associated with the luma slice, the QP of the chroma slice is calculated via a lookup table, which we call a chroma QP table here. A chroma QP table is used to derive the QP for the chroma components of a slice, given the QP used in the luma component of the slice of same picture. The index value to this table is the so-called baseQP (that is, base chroma QP) associated with the considered chroma component, which is obtained as the sum of the corresponding luma slice QP and the chroma QP offset of the considered slice. This chroma QP offset of the considered slice is obtained as the sum of the sequence level chroma QP offset and the slice level chroma QP delta associated to considered slice. The output value corresponding to an index value can then be used as the QP value for encoding or decoding the chroma slice. It should be noted that the slice QP may be further modified by block-level QP adjustment, for example, because of rate control.

In the JEM, the used chroma QP table only depends on the chroma format, for example 4:0:0, 4:2:0, 4:2:2, etc, thus preventing any flexibility.

In an example embodiment, it is proposed to use different chroma QP tables for different encoding configurations. Indeed, the configuration of the coding system, to reach a certain level of coding efficiency, may include the adjustment of encoding parameters, which would include the set of partitions used, and some other parameters. Typically, the maximum tree depth allowed in CTU coding tree representation also impact the overall coding efficiency and allows reaching a desired trade-off between coding efficiency and computational complexity at the encoder side.

One principle of various embodiments is to signal the use of a desired chroma QP table by some means that are independent from the coding tools used to code or decode the sequence. Therefore, the chroma QP table is chosen as a coding configuration parameter in the encoder side. It typically takes the form of a "coding performance level" high level syntax element, which is signaled in the Sequence Parameter Set (SPS) or Picture Parameter Set (PPS). It is decoded by the decoder, which then switches to the same chroma QP table that has been used on the encoder side. In an embodiment, two set of tables are proposed and thus a simple binary flag is sufficient to carry the information. In other embodiments, more than two set of tables are proposed and thus an integer value (or other way to signal one set among others) would be needed. The example illustrated below shows a set of two tables.

The QP value used in JEM ranges from −6 to 51. The chroma QP table used in the JEM for the 4:2:0 color format is made of 58 elements (that is, one entry for each possible QP value) and is typically the following one:

chromaQPTableJEM[b 0 . . . 57]=[0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 37, 37, 38, 39, 40, 41, 42, 43, 44, 45, 46, 47, 48, 49, 50, 51]

In an embodiment, it is proposed to use several sets of chroma QP tables. Tables are differentiated firstly regarding the targeted efficiency of coding and secondly regarding their slice type (for I slice type or non-I slice type). The standard coding efficiency level chroma QP table set is the following, and comprises the values for both I slice type and non-I slice type:

chromaQPTableStandardPerf [2][0 . . . 57]=[[0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 37, 37, 38, 39, 40, 41, 42, 43, 44, 45, 46, 47, 48, 49, 50, 51], [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 29, 30, 31, 32, 33, 33, 34, 35, 36, 36, 37, 37, 38, 39, 40, 41, 42, 43, 44, 45, 46, 47, 48, 49, 50, 51, 52, 53] ]

The high performance coding efficiency level chroma QP table set is the following:

chromaQPTableHighPerf [2][0 . . . 57]=[[0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 29, 30, 31, 32, 33, 33, 34, 34, 35, 35, 36, 36, 37, 37, 38, 39, 40, 41, 42, 43, 44, 45, 46, 47, 48, 49, 50, 51], [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 38, 39, 40, 41, 42, 43, 44, 45, 46, 47, 48, 49, 50, 51, 52, 53, 54]]

The chroma QP tables comprise output QP that are greater or equal to zero, and non-decreasing as a function of the input index. Therefore, for each non-zero input index to a chroma QP table, its output integer value is higher or equal to the output QP value associated with the preceding input index to the table.

The difference between the standard and the high performance table sets is the following one. The output QP value contained in the high performance table set is always greater or equal to the output with the same input index value in the standard performance table set. In practice, this concerns the high QP value in particular.

In the shown example, for the tables corresponding to the non-I slice type, from output QP value 34 in the high performance table set, the output QP value with same input index in the standard performance table set is equal to 33. Then, from that input index in the two tables, the output QP value in high performance QP table of non-I slice are strictly higher than the corresponding output QP value in the standard performance chroma QP table set. This is explained by the fact that as the coding efficiency is increased for the high performance case, the bitrate in chroma components can be reduced while keeping comparable PSNR value in the chroma components. This way, the overall bitrate is reduced, while the objective quality (PSNR) in the luma slice is preserved. Overall some coding gain is obtained in luma, without any penalty, or with limited penalty on the coding efficiency for chroma.

For the two above table sets, two-dimensional arrays are used. The first dimension of the array corresponds to the slice type (for example, 0→1_SLICE, 1→B_SLICE (more generally, non-1 slice)) and second dimension corresponds to the base chroma QP in the considered slice.

As will be described further below, the chroma QP table sets can be stored in both the encoder and decoder, and the encoder can indicate to the decoder which table set is to be selected by the decoder, for example, through a flag or an index. Alternatively, the table sets can be encoded directly in the bitstream.

At the encoder side, the encoder chooses which chroma QP table set to use. The selection can be done by the user through an encoding configuration parameter (typically a flag), which indicates if the high performance chroma QP table set is to be used or not during the encoding and then the decoding processes. In an example embodiment, the selection is done by setting a value of a value in a file, the flag being read by an encoding device that interprets the value of the flag to select which chroma QP table to use. In an example embodiment, the selection is done by a manual operation of a user selecting encoding configuration parameters using a graphical user interface that handles the encoder device.

In another embodiment, it can be automatically selected by the encoder, as a function of the measured coding efficiency obtained in the luma and chroma slices. Typically, this may consist in checking the PSNR values obtained in Cb and Cr components. If these two values are sufficiently higher than the PSNR obtained in the corresponding luma slice, then it may be of interest to increase the QP in the chroma components, to save some bits. To do so, the encoder would select the high performance chroma QP table sets, and would indicate its use in the next SPS, PPS or even slice header.

In an example embodiment, two performance levels are considered: standard and high, and for each setting, two chroma QP tables are used for difference slice types. It should be noted that the present techniques can be used for other number of settings or slice types. In this case, signaling the table cannot be done anymore with a single one-bit flag but requires a parameter providing a larger choice of values, for example an integer number. In addition, the size of the chroma QP table can also be different from 58, for example, the table size can be adapted to the QP range.

Figure 7A:
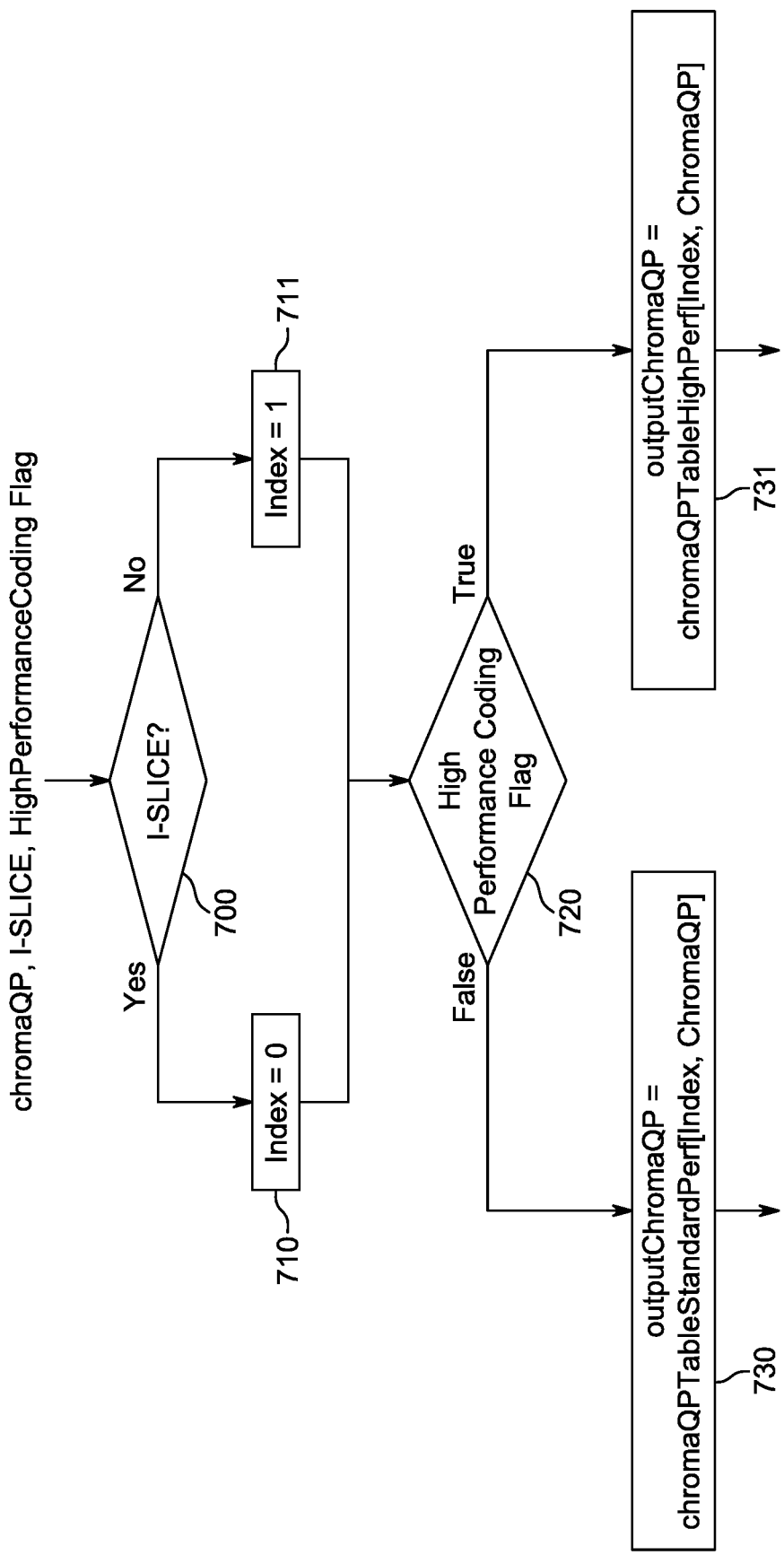
FIG. 7A illustrates an example of process used on the decoder side to determine the QP parameter used for the coding and the decoding of the chroma components.

FIG. 7A illustrates an example of process used on the decoder side to determine the QP parameter used for the coding and the decoding of the chroma components. The inputs to this process are chromaQP that corresponds to the base chroma QP value for the considered slide (and is the value that will be adapted), a "I-SLICE" flag indicating the type of slice and a "HighPerformanceCodingFlag" indicating if high performance encoding efficiency is expected or not. In step 700, the type of slice is checked and in the case of a I-SLICE, in step 710, an index value is set to 0 to point to the set corresponding to the I-SLICE set. In the other case, in step 711, the index value is set to 1 to point to the set corresponding to the non-I-SLICE set. In step 720, the "HighPerformanceCodingFlag" is checked. When the flag is set to true, in step 731 the outputChroma value is then determined from the set of values of the chromaQPTableHighPerf according to the index and the input value. When the "HighPerformanceCodingFlag" is set to false, in step 730 the outputChroma value is then determined from the set of values of the chromaQPTableStandardPerf according to the index and the input value. For example, if the initial chromaQP value is 57 (thus the "highest" value possible), for an I-SLICE in high performance, the chromaQP value will be set to 54 (the last entry of the last table). This will result in reducing the bitrate for the Chroma component. Conventional decoding process is used to produce a decoded image.

As can be seen, this flag is used to drive the use of a chroma QP table in a normative way.

According to at least one embodiment, the choice between the at least two table of chroma QP tables is achieved as a function of some other coding parameters. These coding parameters may be related to the coding tree configuration or on et of activated coding modes, or on the set of activated partitioning modes chosen for the coding of the considered video sequence.

Figure 7B:
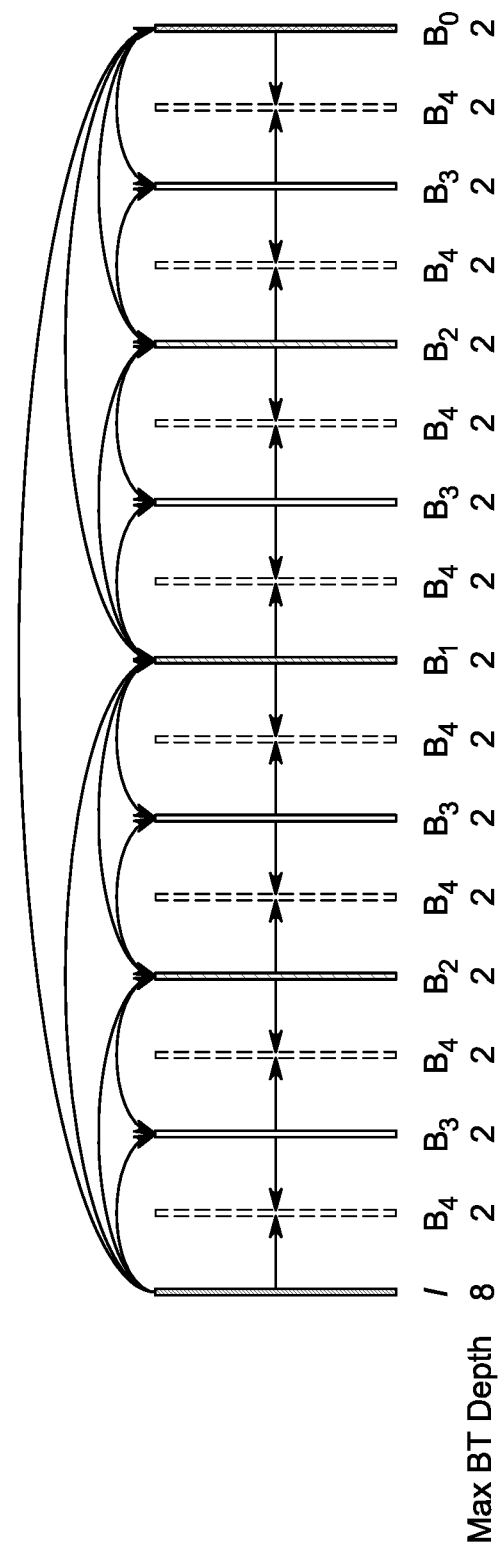
FIG. 7B illustrates maximum Quad-tree and Binary-tree depths allowed for each picture of a random-access sequence.

As an example, the coding parameters that may produce a standard performance level with the considered video codec may be the following one. The coding tree configuration used varies according to the slice type and the temporal layer. The maximum Quad-tree and Binary-tree depths allowed for each picture of a random-access sequence is shown in FIG. 7B and is detailed on ABT and coding tree configuration for the standard performance level.

Table 1 illustrates the Maximum Quad-Tree depth and Binary-Tree depth used in the medium complexity profile, for each slice type, temporal layer, component, for Random-Access coding structure. As can be seen on this table, the maximum allowed quad-tree depth varies according to the slice type, temporal level and component. Moreover, the maximum allowed Binary Tree depth varies according to the slice type, slice temporal layer and quad-tree depth level.

TABLE 1

| | | | Max BT depth for each QT depth = 0 . . . 5 | | | | | |
|---|---|---|---|---|---|---|---|---|
| Slice Type | T-Id | Min/Max QT depth | Component type | QT Depth 0 SizeY 256 | QT Depth 1 SizeY 128 | QT Depth 2 SizeY 64 | QT Depth 3 SizeY 32 | QT Depth 4 SizeY 16 | QT Depth 5 SizeY 8 |
| I | 0 | 0/3 | Luma | 0 | 0 | 2 | 6 | | |
| | | | Chroma | 0 | 2 | 8 | 0 | | |
| B | 0 | 0/5 | Luma/Chroma | 0 | 3 | 3 | 3 | 3 | 3 |
| B | 1 | 0/5 | Luma/Chroma | 0 | 2 | 2 | 2 | 2 | 2 |
| B | 2 | 0/5 | Luma/Chroma | 0 | 2 | 2 | 2 | 2 | 2 |
| 8 | 3 | 0/5 | Luma/Chroma | 0 | 2 | 2 | 2 | 2 | 2 |
| B | 4 | 0/5 | Luma/Chroma | 0 | 2 | 2 | 2 | 2 | 2 |

Furthermore, in the standard performance level encoding process, the Quad-Tree and Binary-Tree multiple depths configuration of ABT and coding tree configuration for Medium Complexity (Random Access) is used as the starting configuration when coding a Random-Access intra period. It may be used as the starting coding tree configuration for each Intra period, in the case parallel coding of intra periods is desired.

In addition to that starting configuration, a dynamic adaptation process of the maximum quad-tree and binary-tree depth for subsequent pictures is employed, based on the average quad- and binary-coding trees used in already coded picture in the same temporal level, in the considered intra period.

Furthermore, the coding parameters that may produce a high-performance level with the considered video codec are typically the following ones. The coding tree configuration when starting to code an Intra period is modified for B slices compared to the standard performance configuration. The maximum BT depth is always equal to 3, except for the quad-tree depth level 0. This corresponds to following table.

compared to the standard performance level configuration. Typically, the Asymmetric Binary Tree split mods may be deactivated in B slices with a temporal layer strictly higher than 0. Furthermore, some other coding modes, which involve some encoder side rate distortion choice, hence encoder complexity, may be deactivated in the low complexity encoder profile/configuration. For instance, some inter coding tools, like template-based motion search or template based affine motion model search for temporal prediction, may be deactivate in the case of the low complexity profile. In other words, when the tools used are of lower performance level, a chroma QP table with low performance is also chosen.

According to at least one embodiment, the choice of the chroma QP table, between the standard performance one, the high performance one and optionally a low complexity additional one, may be chosen dynamically in each slice, according to the coding tree configuration, and possibly according to the partitioning modes allowed in the considered slice. Therefore, in this embodiment, the chroma QP table used may vary from slice to slice. In that case, the

TABLE 2

| | | | Max BT depth for each QT depth = 0 . . . 5 | | | | | |
|---|---|---|---|---|---|---|---|---|
| Slice Type | T-Id | Min/Max QT depth | Component type | QT Depth 0 SizeY 256 | QT Depth 1 SizeY 128 | QT Depth 2 SizeY 64 | QT Depth 3 SizeY 32 | QT Depth 4 SizeY 16 | QT Depth 5 SizeY 8 |
| I | 0 | 0/3 | Luma | 0 | 0 | 2 | 6 | | |
| | | | Chroma | 0 | 2 | 6 | 0 | | |
| B | 0 | 0/5 | Luma/Chroma | 0 | 3 | 3 | 3 | 3 | 3 |
| B | 1 | 0/5 | Luma/Chroma | 0 | 3 | 3 | 3 | 3 | 3 |
| B | 2 | 0/5 | Luma/Chroma | 0 | 3 | 3 | 3 | 3 | 3 |
| B | 3 | 0/5 | Luma/Chroma | 0 | 3 | 3 | 3 | 3 | 3 |
| B | 4 | 0/5 | Luma/Chroma | 0 | 3 | 3 | 3 | 3 | 3 |

In other words, Max BT depth is one parameter related to the coding tree configuration that can be used to select the coding performance level and thus select the correspond chroma QP table. According to table 1 and 2 for example, when Max BT depth is equal to 2, the standard performance level chroma QP table is selected and when Max BT depth is greater than 2, the high performance level chroma QP table is selected.

According to a further embodiment, an additional low complexity encoder configuration may be used. In this case, the chroma QP table presented before, which is linked to the standard encoder performance level, may be employed in this low encoder complexity configuration. Alternatively, a dedicated third chroma QP table may be used in the case of the low complexity encoder configuration.

The low complexity encoder configuration introduced here correspond to the following typical encoding parameters. The combinatory level of the partitioning mode rate distortion search may be further reduced in some slices chroma QP table used may be signaled in the slice header, picture header or slice group header.

According to a further alternative of the last embodiment, the chroma QP table may not be explicitly signaled in the slice, picture or tile group header, but may be inferred by the decoder according to the coding tree configuration used in the considered slice, and also, optionally, the coding modes allowed in the considered slice.

In the same way as last embodiment, in the case the same chroma QP table is used in the whole sequence, GOP (Group of Pictures) or intra period, the chroma QP table used in this sequence, intra period or GOP may also be inferred by the decoder, as a function of the coding tree configuration used and signaled in header data, and also, optionally, as a function of the coding mode allowed in the coding/decoding of the considered sequence, intra period or GOP.

The above methods of adapting the chroma quantization parameter can be used to modify the quantization and de-quantization modules (130, 140, 240) of the JVET or HEVC encoder and decoder as shown in FIG. 1 and FIG. 2. Moreover, the present embodiments are not limited to JVET or HEVC, and can be applied to other standards, recommendations, and extensions thereof. Various embodiments described above can be used individually or in combination.

Figure 8:
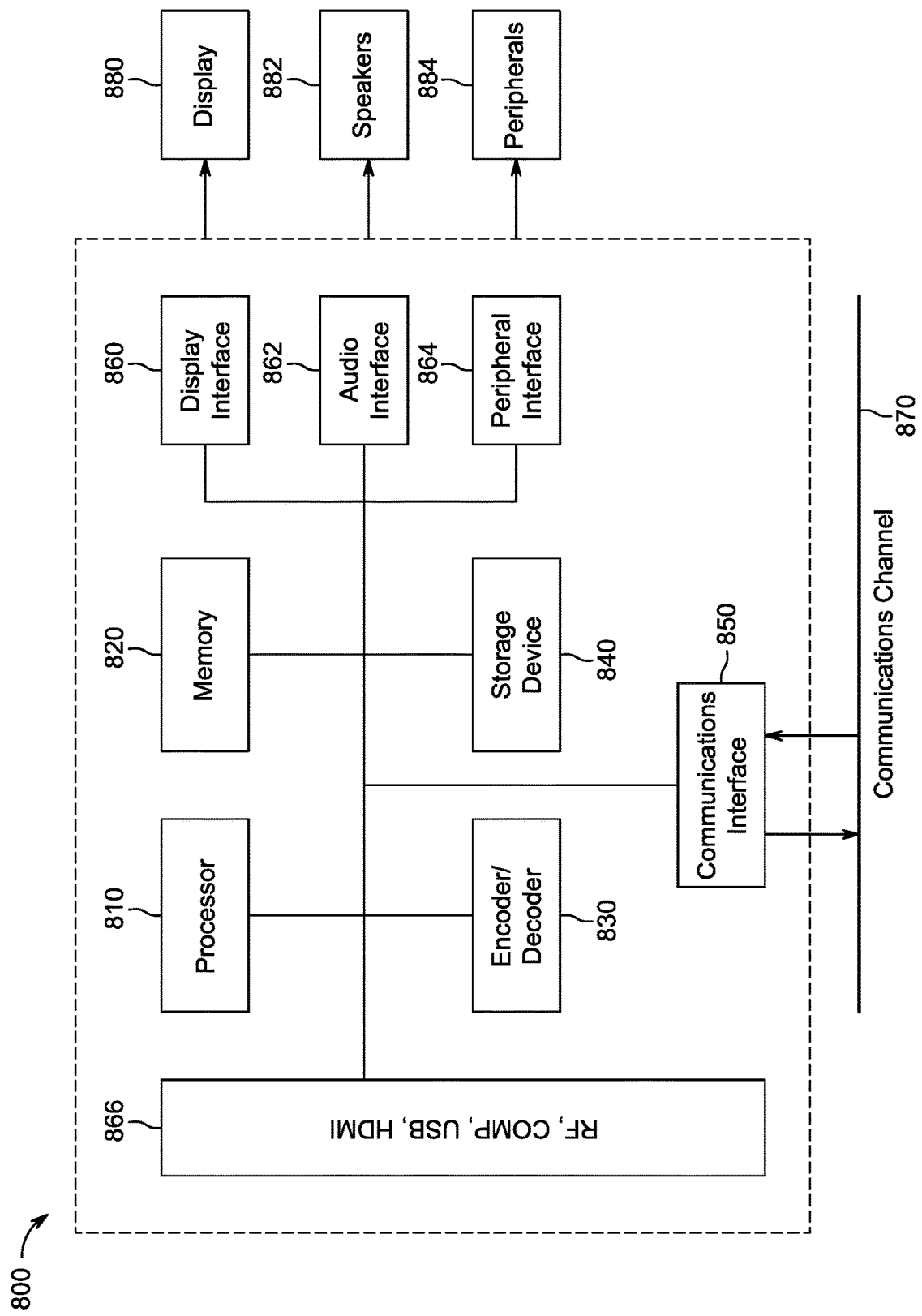
FIG. 8 illustrates a block diagram of an example of a system in which various aspects and embodiments are implemented.

FIG. 8 illustrates a block diagram of an example of a system in which various aspects and embodiments are implemented. In at least one embodiment, system 800 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 800, singly or in combination, can be embodied in a single integrated circuit, multiple ICs, and/or discrete components. For example, in at least one embodiment, the processing and encoder/decoder elements of system 800 are distributed across multiple ICs and/or discrete components. In various embodiments, the system 800 is communicatively coupled to other similar systems, or to other electronic devices, via, for example, a communications bus or through dedicated input and/or output ports. In various embodiments, the system 800 is configured to implement one or more of the aspects described in this document.

The system 800 includes at least one processor 810 configured to execute instructions loaded therein for implementing, for example, the various aspects described in this document. Processor 810 can include embedded memory, input output interface, and various other circuitries as known in the art. The system 800 includes at least one memory 820 (e.g., a volatile memory device, and/or a non-volatile memory device). System 800 includes a storage device 840, which can include non-volatile memory and/or volatile memory, including, but not limited to, EEPROM, ROM, PROM, RAM, DRAM, SRAM, flash, magnetic disk drive, and/or optical disk drive. The storage device 840 can include an internal storage device, an attached storage device, and/or a network accessible storage device, as non-limiting examples.

System 800 includes an encoder/decoder module 830 configured, for example, to process data to provide an encoded video or decoded video, and the encoder/decoder module 830 can include its own processor and memory. The encoder/decoder module 830 represents module(s) that can be included in a device to perform the encoding and/or decoding functions. As is known, a device can include one or both of the encoding and decoding modules. Additionally, encoder/decoder module 830 can be implemented as a separate element of system 800 or can be incorporated within processor 810 as a combination of hardware and software as known to those skilled in the art.

Program code to be loaded onto processor 810 or encoder/decoder 830 to perform the various aspects described in this document can be stored in storage device 840 and subsequently loaded onto memory 820 for execution by processor 810. In accordance with various embodiments, one or more of processor 810, memory 820, storage device 840, and encoder/decoder module 830 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 810 and/or the encoder/decoder module 830 is used to store instructions and to provide working memory for processing that is needed during encoding or decoding. In other embodiments, however, a memory external to the processing device (for example, the processing device can be either the processor 810 or the encoder/decoder module 830) is used for one or more of these functions. The external memory can be the memory 820 and/or the storage device 840, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 800 can be provided through various input devices as indicated in block 866. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 866 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 800 to other electronic devices across USB and/or HDMI connections. It is to be understood that various aspects of input processing, for example, Reed-Solomon error correction, can be implemented, for example, within a separate input processing IC or within processor 810 as necessary. Similarly, aspects of USB or HDMI interface processing can be implemented within separate interface ICs or within processor 810 as necessary. The demodulated, error corrected, and demultiplexed stream is provided to various processing elements, including, for example, processor 810, and encoder/decoder 830 operating in combination with the memory and storage elements to process the data stream as necessary for presentation on an output device.

Various elements of system 800 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 800 includes communication interface 850 that enables communication with other devices via communication channel 870. The communication interface 850 can include, but is not limited to, a transceiver configured to transmit and to receive data over communication channel 870. The communication interface 850 can include, but is not limited to, a modem or network card and the communication channel 870 can be implemented, for example, within a wired and/or a wireless medium.

Data is streamed to the system 800, in various embodiments, using a Wi-Fi network such as IEEE 802.11. The Wi-Fi signal of these embodiments is received over the communications channel 870 and the communications interface 850 which are adapted for Wi-Fi communications. The communications channel 870 of these embodiments is typically connected to an access point or router that provides access to outside networks including the Internet for allowing streaming applications and other over-the-top communications. Other embodiments provide streamed data to the system 800 using a set-top box that delivers the data over the HDMI connection of the input block 866. Still other embodiments provide streamed data to the system 800 using the RF connection of the input block 866.

The system 800 can provide an output signal to various output devices, including a display 880, speakers 882, and other peripheral devices 884. The other peripheral devices 884 include, in various examples of embodiments, one or more of a stand-alone DVR, a disk player, a stereo system, a lighting system, and other devices that provide a function based on the output of the system 800. In various embodiments, control signals are communicated between the system 800 and the display 880, speakers 882, or other peripheral devices 884 using signaling such as AV Link, CEC, or other communications protocols that enable device-to-device control with or without user intervention. The output devices can be communicatively coupled to system 800 via dedicated connections through respective interfaces 860, 862, and 864. Alternatively, the output devices can be connected to system 800 using the communications channel 870 via the communications interface 850. The display 880 and speakers 882 can be integrated in a single unit with the other components of system 800 in an electronic device such as, for example, a television. In various embodiments, the display interface 860 includes a display driver, such as, for example, a timing controller (T Con) chip.

The display 880 and speaker 882 can alternatively be separate from one or more of the other components, for example, if the RF portions of input 866 is part of a separate set-top box. In various embodiments in which the display 880 and speakers 882 are external components, the output signal can be provided via dedicated output connections, including, for example, HDMI ports, USB ports, or composite (COMP) outputs.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figure 9A:
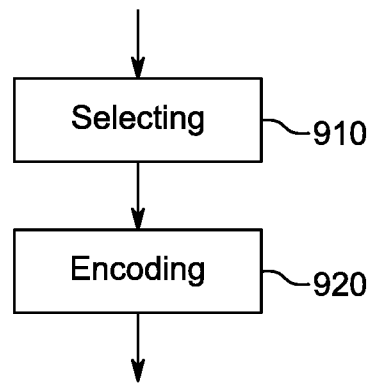
FIG. 9A illustrates a flowchart of an example of a part of an encoding method according to an embodiment implementing the chroma quantization adaptation.

FIG. 9A illustrates a flowchart of an example of encoding method according to an embodiment implementing the chroma quantization adaptation. Such an encoding method can be performed by the system 800 described in FIG. 8 and more precisely can be implemented by the processor 810. In at least one embodiment, in step 910, the processor 810 selects which chroma QP table set should be used. As described above, the selection can be done using different techniques, for example manually by the user or automatically by the encoder, for example dynamically in each slice according to the coding tree configuration. Once this selection is done, the encoding is performed in step 920 according to the selected quantization parameters for the chroma components and the selection of the chroma QP table is signaled in the high-level syntax elements (for example in the next SPS, PPS or even slice header).

Figure 9B:
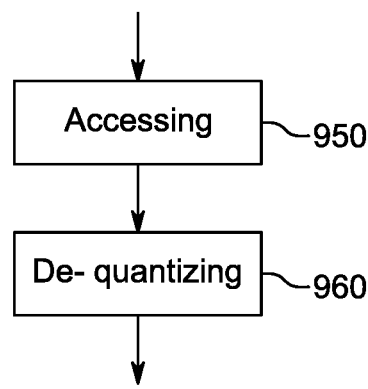
FIG. 9B illustrates a flowchart of an example of a part of a decoding method according to an embodiment implementing the chroma quantization adaptation.

FIG. 9B illustrates a flowchart of an example of a part of a decoding method according to an embodiment implementing the chroma quantization adaptation. Such a decoding method can be performed by the system 800 described in FIG. 8 and more precisely can be implemented by the processor 810. In at least one embodiment, in step 950, the signal is accessed (for example received on an input interface or read from a media support). The high level syntax elements are extracted and analyzed to determine the quantization parameters for the chroma components that have been selected at the encoding device. In step 960, these parameters are used to dequantize the chroma components. Conventional decoding process is used to produce a decoded image (not illustrated in the FIG. 9B) that can be for example provided to a device or displayed on a device.

According to another embodiment the number of the coding performance levels used to drive the switch between different chroma QP tables takes a value N>=2. The SPS syntax element introduced here then takes the form of an integer value According to an embodiment, because the temporal level usually affects the performance level, the value of the coding performance level depends on the temporal layer to which the slice belongs to. As a consequence, different temporal levels can use different chroma QP tables. This typically applies to the random access temporal coding structure. The SPS element introduced here then includes one coding level value per temporal level.

According to another embodiment, the chroma QP table set is directly coded in the SPS or PPS, under the form of a series of chroma QP values, for each entry of the table. In one example of this embodiment, the table is only coded and decoded for some slice type, typically B slices.

According to another embodiment, the chroma QP table is directly coded in the SPS or PPS, as a series of differential (residual) integer values, indicates the delta between the base chroma QP and the output chroma QP, for each entry in the table.

According to a further embodiment, when the chroma QP table is directly encoded, the chroma QP values are coded only for a limited range (or subset) of the input baseQP values.

According to another embodiment, the chroma QP table is directly coded in the SPS or PPS, as a series of differential (residual) integer values. The first QP delta is coded relatively to the base chroma QP, while following values are coded differentially with the previous value. In another embodiment, the delta with the previous value is assumed to be always positive (no sign to encode).

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to a variant embodiment according to first aspect, a method is presented, further comprising generating a bitstream comprising at least said encoded block and metadata representative of said at least one selected chroma quantization parameter.

According to a variant embodiment according to second aspect, a method is presented, further comprising producing a reconstructed image based on the de-quantized chroma values of a plurality of blocks of the image.

According to a variant embodiment according to third aspect, a signal is presented, further comprising an encoding of at least one block of the image.

According to a variant embodiment according to fourth aspect, a device is presented, further comprising means for generating a bitstream comprising at least said encoded block and metadata representative of said at least one selected chroma quantization parameter.

According to a variant embodiment according to fifth aspect, a device is presented, further comprising producing a reconstructed image based on the de-quantized chroma values of a plurality of blocks of the image.

The invention claimed is:

1. A method comprising:
selecting, for a block of an image, a chroma quantization parameters table from amongst a plurality of pre-determined chroma quantization parameters tables based on an encoding performance level;
encoding said block based on the selected chroma quantization parameters table, wherein the encoding comprises quantizing chroma values of said block according to said at least one value of the selected chroma quantization parameters table; and
generating a bitstream comprising at least said encoded block and high-level syntax information comprising a flag representative of the encoding performance level.

2. The method of claim 1, wherein the encoding performance level is automatically chosen according to information related to coding, said information being related to the coding tree configuration or the coding mode or the partitioning mode.

3. The method of claim 1, wherein the plurality of pre-determined chroma quantization parameters tables are one-directional tables for which outputs are greater or equal to zero, and a plurality of values of each table are increasing as a function of the input index.

4. A non-transitory computer readable medium comprising computer-executable instructions to enable a processor to perform the method of claim 1.

5. A method comprising:
accessing metadata for a block of an image or video, said metadata comprising a high-level syntax flag representative of an encoding performance level;
selecting a chroma quantization parameters table from amongst a plurality of pre-determined chroma quantization parameters tables based on the high-level syntax flag representative of the encoding performance level; and
de-quantizing chroma values of the block using at least one value of the selected chroma quantization parameters table.

6. The method of claim 5, further comprising producing a reconstructed image based on the de-quantized chroma values of a plurality of blocks of the image.

7. The method of claim 5, wherein the plurality of pre-determined chroma quantization parameters tables are one-directional tables for which outputs are greater or equal to zero, and a plurality of values of each table are increasing as a function of the input index.

8. A non-transitory computer readable medium comprising computer-executable instructions to enable a processor to perform the method of claim 5.

9. A device comprising:
a non-transitory computer readable medium storing a plurality of pre-determined chroma quantization parameters tables; and
one or more processors configured to:
select, for a block of an image, a chroma quantization parameters table from amongst the plurality of pre-determined chroma quantization parameters tables based on an encoding performance level;

encode said block based on the selected chroma quantization parameters table, wherein the encoding comprises quantizing chroma values of said block according to said at least one value of the selected chroma quantization parameters table; and generate a bitstream comprising at least said encoded block and high-level syntax information comprising a flag representative of the encoding performance level.

10. The device of claim 9, wherein the encoding performance level is automatically chosen according to information related to coding, said information being related to the coding tree configuration or the coding mode or the partitioning mode.

11. The device of claim 9, wherein the plurality of pre-determined chroma quantization parameters tables are one-directional tables for which outputs are greater or equal to zero, and a plurality of values of each table are increasing as a function of the input index.

12. A device comprising:

a non-transitory computer readable medium storing a plurality of pre-determined chroma quantization parameters tables; and one or more processors configured to:

access metadata for a block of an image or video, said metadata comprising a high-level syntax flag representative of an encoding performance level;

select a chroma quantization parameters table from amongst the plurality of pre-determined chroma quantization parameters tables based on the high-level syntax flag representative of the encoding performance level;

de-quantize chroma values of the block using at least one value of the selected chroma quantization parameters table; and produce a reconstructed image based on the de-quantized chroma values of a plurality of blocks of the image.

13. The device of claim 12, further comprising a display configured to display the reconstructed image.

14. The device of claim 12, further comprising an antenna configured to receive a signal over the air comprising an image or a video.

15. The device of claim 12, further comprising an output configured to provide the reconstructed image.

16. The device of claim 12, wherein the plurality of pre-determined chroma quantization parameters tables are one-directional tables for which outputs are greater or equal to zero, and a plurality of values of each table are increasing as a function of the input index.

17. The method of claim 1, wherein the high-level syntax information comprising the flag representative of the encoding performance level is inserted in a sequence parameter set or a picture parameter set or a slice header.

18. The method of claim 5, wherein the high-level syntax information comprising the flag representative of the encoding performance level is inserted in a sequence parameter set or a picture parameter set or a slice header.

19. The device of claim 9, wherein the high-level syntax information comprising the flag representative of the encoding performance level is inserted in a sequence parameter set or a picture parameter set or a slice header.

20. The device of claim 12, wherein the high-level syntax information comprising the flag representative of the encoding performance level is inserted in a sequence parameter set or a picture parameter set or a slice header.

* * * * *